United States Patent [19]

Kinzl et al.

[11] Patent Number: 4,468,596
[45] Date of Patent: Aug. 28, 1984

[54] METHOD AND APPARATUS FOR THE ELECTRONIC OPERATION AND MONITORING OF THE OPENING CYCLE OR CLOSING CYCLE OF ELECTRICALLY OPERABLE UNITS

[75] Inventors: Marwin Kinzl, Kierspe; Eduard Bergmann, Luedenscheid, both of Fed. Rep. of Germany

[73] Assignee: Leopold Kostal GmbH & Co. KG, Luedenscheid, Fed. Rep. of Germany

[21] Appl. No.: 301,026

[22] Filed: Sep. 10, 1981

[30] Foreign Application Priority Data

Sep. 11, 1980 [DE] Fed. Rep. of Germany ....... 3034118

[51] Int. Cl.³ .............................................. H02P 7/20
[52] U.S. Cl. .................................. 318/287; 318/286; 318/468
[58] Field of Search ............................... 318/264–266, 318/282–283, 285–286, 135, 739, 291, 293, 445, 449, 450, 452, 459, 466, 468, 470, 484

[56] References Cited

U.S. PATENT DOCUMENTS

| 4,234,833 | 11/1980 | Barrett | 318/282 |
| 4,328,540 | 5/1982 | Matsuoka et al. | 318/469 |
| 4,338,553 | 7/1982 | Scott, Jr. | 318/466 |

Primary Examiner—Joseph V. Truhe
Assistant Examiner—A. Evans
Attorney, Agent, or Firm—Robert E. Knechtel

[57] ABSTRACT

A method and apparatus for operating and monitoring the opening and closing cycle of electrically operated units such as electric windows and electric slide roofs which both eliminates the danger of body parts getting caught in the window and permits a complete opening and closing of the window automatically. In accordance with the invention, the speed of the drive motor is measured, directly or indirectly, and the first obtained measured value is compared with all following measured values. More particularly, this first measured value is used to detect momentary electrical and mechanical factors which change over the entire time of operation of the window, such as self-heating of the drive motor, the voltage charge of the battery, and the state and condition of the window. The processing or comparing of the measured values is carried out by a microcomputer. The actual measuring of the speed is by means of a sensor. The changes furnished by those sensors are utilized to determine the position of the window. This recognition of the position makes it possible in case of danger, to safely turn off the drive motor and possibly to open the window again. Further still, in a normal case, the window may be closed completely.

4 Claims, 2 Drawing Figures

METHOD AND APPARATUS FOR THE ELECTRONIC OPERATION AND MONITORING OF THE OPENING CYCLE OR CLOSING CYCLE OF ELECTRICALLY OPERABLE UNITS

This invention relates to a method and apparatus for the electronic operation and monitoring of the opening cycle or closing cycle of electrically operable units, such as, for example, electric windows and electric slide roofs of automotive vehicles, where the electric drive motor is connected to the vehicle's battery and is actuated by way of electric switches.

With present day electric windows, the danger exists that passengers in the automotive vehicle, particularly children, could be injured by the closing window. In most cases, the drive motor is turned off only by releasing the push button which is operated to energize it or by a bi-metallic switch in the drive motor opening as a result of an overload. In such cases, the drive motor is turned off, but the position of the window pane remains unchanged, hence the danger of injury is considerably increased, particularly if the neck, head or fingers are caught.

Another disadvantage of the present-day electric windows is that the push-button switch must be operated during the entire cycle of motion in order to close or open the window completely. With such an arrangement the drive motor is operated directly by way of the push-button switches. Thus, the push-button switches must switch the entire power.

Prior attempts have been made to improve these present-day electric systems. For example, in one case, the increase in the current drawn by the drive motor was measured. The current rise, which occurred when an object was caught in the window, was used to serve as a turn-off criteria, hence, greater safety was supposed to be achieved. However, the problem exists in measuring the current because of the many variable factors that influence the current drawn by the drive motor. For example, the supply voltage (supply voltage range) may fluctuate, or the current rise may change as a result of the self-heating of the motor. Further still, the load on the drive motor may change as a result of the curvature of the window and hence the current drawn by the drive motor may likewise change. Also, since the position of the window is unknown, it cannot be distinguished by the current rise, whether endangered parts of the body are being caught in the window or whether the window is closed. Accordingly, when the current drawn by the drive motor is measured, only two possibilities exist. The drive motor can be turned off in a safe fashion, thus providing protection against parts of the body betting caught in the window. However, in such a case, the window cannot be completely closed. Alternatively, the drive motor can be turned off in an unsafe fashion, thus reducing the protection provided against parts of the body getting caught in the window. However, in this latter case, complete closing of the window is possible.

Accordingly, it is an object of the present invention to provide a method and apparatus for operating and monitoring the opening and closing cycle of electrically operated units such as electric windows and electric slide roofs which both eliminates the danger of body parts getting caught in the window and permits a complete opening and closing of the window automatically.

In accordance with the present invention, the speed of the drive motor is measured, directly or indirectly, and the first obtained measured value is compared with all following measured values. More particularly, this first measured value is used to detect momentary electrical and mechanical factors which change over the entire time of operation of the window, such as self-heating of the drive motor, the voltage charge of the battery, and the state and condition of the window. The processing or comparing of the measured values is carried out by a microcomputer. The actual measuring of the speed can be by means of a sensor, such as, for example, an aperture disc and a light barrier, a Hall I.C. or similar sensor, which is placed in the drive motor or attached on the drive motor. The sensor can also be located in or on the mechanical raising system of the drive motor. Furthermore, the measuring of the speed can be carried out by putting a screen into the window pane in connection with optical-electronic sensors. The number of changes per unit of time, which are furnished by these sensors, are a measurement for the speed of the drive motor. These changes are continuously read into and processed by the microcomputer.

Also, with the system of the invention, the changes furnished by those sensors are utilized to determine the position of the window. This recognition of the position makes it possible in case of danger, to safely turn off the drive motor and possible to open the window again. Further still, in a normal case, the window may be closed completely.

BRIEF DESCRIPTION OF THE DRAWINGS

For a fuller understanding of the nature and objects of the invention, reference should be had to the following detailed description taken in connection with the accompanying drawing, in which.

DESCRIPTION OF THE EMBODIMENT

Figure 1:
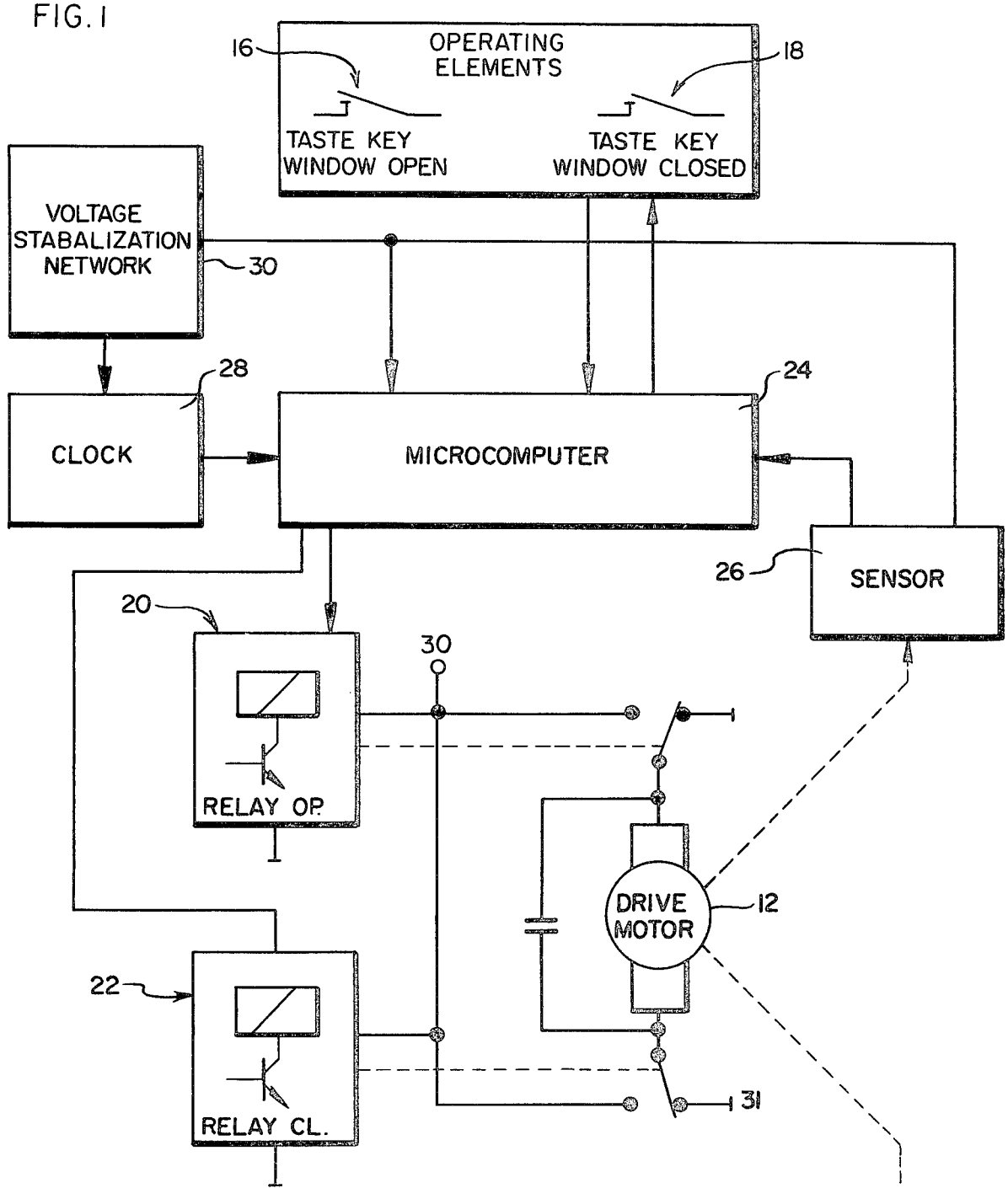
FIG. 1 is a block diagram schematic of the system of the invention.
Figure 2:
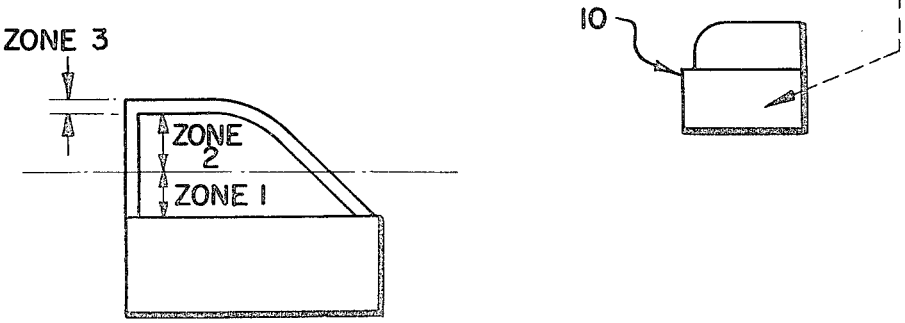
FIG. 2 is a view generally illustrating the three zones established for the operation of the system, during the opening and closing cycle of the window.

Referring now to the drawing, particularly FIG. 1, there is generally illustrated a window 10 which is opened and closed by means of an electric drive motor 12. Normally, the operation of the drive motor 12 in opening or closing the window 10 is by means of a window open switch 16 and a window close switch 18 which, in turn, control relays 20 and 22, respectively. These relays 20 and 22 switch the power supply to the drive motor 12 to open and close the window, respectively. In accordance with the present invention, a microcomputer 24 and at least one sensor 26 are provided for monitoring the opening and closing cycle of, in this case, the electric window 10, in the manner more fully described below. An electronic clock 28 provides timing pulses to the microcomputer 24 for controlling its operation, and a voltage stabilization network 30 likewise is provided.

When the vehicle's battery is connected, the microcomputer 24 designates the position of the window pane 10 at that time as the state "window closed" and sets its position counter to the value "0". If the window pane is moved now, by operating one of the switches 16 and 18, the sensor 26 detects this movement, and signals corresponding to changes from 0 to 1, or vice versa, are coupled from the sensor 26 to the microcomputer 24 which adds or subtracts the signals, depending upon the direction of rotation, from the count in its position counter. When the window is being opened, the changes are added. When the window is being closed, the changes are subtracted.

Starting from the position "window opened", the window pane passes through 3 zones (zone 1, 2 and 3) during the closing operation. The zones 1 and 3 are zones in which the drive motor 12 is turned off only after it has been in a blocked position for a short time. A blocked position is detected by a blocking counter of the microcomputer 24 whose time is variable. If changes are no longer coupled from the sensor 26 to the blocking counter, for example, when the window is completely opened or completely closed, the blocking counter functions to turn off the drive motor 12 so that it is not overloaded. Accordingly, the bi-metallic switch normally provided in the drive motor can be eliminated.

The clock frequency of the microcomputer 24 is time determining for all counters and measurings.

Zone 2 is a safety zone in which starting from the designated first measured value, there is determined by continuous tests, whether a limit value has been exceeded. If the limit value is exceeded, the drive motor is stopped and subsequently put in operation in the opposite direction so that the window opens. The extent to which the window is opened is variable. This first-measured value includes all electrical and mechanical factors of the window which change during the entire time of operation and, if the window is closed at the time the vehicle's battery is connected, the system operates with complete safety immediately. If the window is not closed at the time the vehicle's battery is connected, during the following first closing cycle, only conditional safety exists, i.e., the window will not open in case of danger. However, after a certain value has been exceeded, the drive motor is turned off immediately. More particularly, during this first closing cycle, the microcomputer 24 waits a so-called reaction time and measures then the time between two changes, e.g., the time between two changes between 0 to 1 or from 1 to 0. A maximum permissible value is then established from the measured time between two changes and taken as the initial value for the tests which then follow. If this first or established measured value is reached during one of these tests, the drive motor is turned off. With this type of operation, the amount of the first or established measured value, is sufficient to close the window completely before the drive motor 12 is turned off.

If the window 10 is already closed and the "window closed" key 18 is operated, the drive motor 12—because of the fact that the window is blocked—is turned off by the blocking counter after an established time of approximately 500 milliseconds, but the time is variable. If the "window closed" key 18 is again operated and the drive motor 12 is again turned off by the blocking counter, the position timer of the microcomputer 24 regenerates and assumes a value of 0. Accordingly, if the window is closed, and the "window closed" key 18 is operated, the drive motor is turned off and each time the position counter assumes the value of 0.

If starting from the position "window closed", the window is opened, the incoming changes of the sensor are added in the position counter of the microcomputer 24.

The switches 16 and 18 are operable to open and close the window 10, under the control of the microcomputer 24, as follows:

(a) Momentary operation of either switch 16, 18 ($t \leq 0.5s$):

The window 10 will open or close completely, with the final turn-off of the drive motor 12 being by way of the blocking counter of the microcomputer 24.

(b) Long operation of either switch 16, 18 ($t \geq 0.5s$):

The window 10 is moved as long as the switch is operated.

(c) When the same switch 16, 18 is operated for a second time, whether long or short:

The movment of the window 10 is stopped.

(d) When a switch 16, 18 is operated and the opposite switch then operated:

The second operated switch overrides the operation of the first switch.

Starting from the position "window closed", if the window 10 is opened, the changes detected by the sensor 26 are added in the position counter of the microcomputer 24. If the window 10 is being closed, the changes detected by the sensor 26 are subtracted in the position counter. Also, the microcomputer 26 determines from the position counter where the window 10 is, i.e., which zone the window is in. If the window is in zone 1, the time between two changes is measured when the window enters zone 2 and is stored. This time between these two changes constitutes the first measured value, and establishes a limit value with which each subsequent change is compared. If this limit value is exceeded while the window 10 is in zone 2, it leads to an emergency opening. However, if the window is in zone 1 and is blocked, the drive motor 12 is stopped after the time out of the blocking counter of the microcomputer 24.

If the window 10 is in zone 2 at the start, the first measured value is taken after waiting a so-called play-balance, i.e., the balancing of the play in the mechanical raising system. This first measured value again establishes a limit value against which subsequent changes are compared and, if it is exceeded, an emergency opening occurs. By dividing the window in these 3 zones and measuring the speed of the motor, it is possible both to protect parts of the body from injury and yet to completely close the window. With the provision of the emergency opening, injuries resulting from parts of the body, such as, fingers, arms or head, are avoided.

It is also advantageous to have the cycle independent of the on-board voltage so that no error pulse for the cycle or sensor is produced in case of a sudden voltage drop in the on-board network during the operation of the window raiser. Accordingly, the voltage stabilization circuit 30 is provided.

From the above description, it can be seen that an improved method and apparatus for the electronic operation and monitoring of the opening and closing cycle of electrical operable units, such as, electric windows and electric slide roofs of automotive vehicles is provided. Some of the essential characteristics of the invention are summarized as follows:

(1) Digital detecting of the motor speed by way of apertured disk and light barrier, Hall IC and similar sensors in connection with a microcomputer.

(2) Placing of these sensors:

(a) in or on the window raiser motor, (b) in or on the mechanical raising system, (c) apertured disk-type screen in the window pane in connection with a light barrier or a similar sensor.

(3) Position recognition which is carried out by the sensor by means of the number of changes.

(4) Division of the window into zones so as to provide a safety zone, which makes possible an emergency opening, and a zone which makes possible the safe closing of the window.

(5) In the safety zone, emergency opening in case of danger—with the manner of opening being variable.

(6) So-called play balance (balancing of the play in the mechanical raising system). Play balancing can be variable.

(7) Blocking time which starts when changes are no longer received from the sensor and the motor is then turned off automatically.

(8) Possibly 2 light barriers which make possible the clear recognition of the direction of rotation and thereby a clear allocation of the changes.

(9) If a measured value pick-up does not take place, the emergency opening is brought about by the additional counter in case of danger.

(10) After the start of the window raiser motor, the first measured value is picked up. Therefrom a limit value which, if it is exceeded during one of the continuous checks, can lead to emergency opening.

(11) If, after the supply voltage has been put on, one of the windows is not closed completely, only conditional safety exists for the remaining closing path. Conditional safety means only that no emergency opening takes place. Nevertheless, the drive motor is turned off.

(12) After each blocking run in the direction of rotation "closed", the position counter is set back.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A method for electronically operating and monitoring the opening and closing cycle of electrically operable units, such as, for example, electric windows and electric siding roofs of automotive vehicles including electric motor means for opening and closing the electrically operable units and computer means for controlling the operation of the electric motor means comprising the steps of:
    (a) coupling to the computer means signals representing the position of the unit at fixed positions during the opening cycle of the unit;
    (b) coupling to the computer means signals representing the position of the unit at fixed positions during the closing cycle of the unit and subtracting those signals from the signals representing the position of the unit during the opening cycle, the difference in said signals indicating whether the unit is in a first, a second or a third zone, said first zone being in a range extending from open to approximately half open, said second zone being in a range extending from approximately half open to almost fully closed and said third zone being in a range extending from almost fully closed to fully closed, said second zone providing a safety zone,
    (c) determining the time interval between any two consecutive signals coupled to the computer means, and
    (d) turning off the electric motor means if the time interval between any two consecutive signals exceeds a pre-established standard value and the unit is in the first or third zones.

2. The method of claim 1 furthur comprising the step of;
    (e) reversing the direction of travel of the unit if the time interval between any two consecutive signals during the closing cycle exceeds a pre-established standard value and the unit is in the second zone.

3. Apparatus for operating and monitoring the opening and closing cycles of electrically operable units, such as, for example, electric windows and sliding roofs of automative vehicles comprising, in combination:
    (a) electric motor means for opening and closing said electrically operable units;
    (b) switch means for activating said electric motor means to open and close said electrically operable units;
    (c) computer means coupled with said electric motor means and said switch means;
    (d) sensor means for detecting and coupling to said computer means signals representing the position of said electrically operable units at fixed positions during the opening and closing cycles thereof;
    (e) said computer means being operable to substract the number of signals coupled to it during the closing cycle from the number of signals coupled to it during the opening cycle, the difference in the number of signals indicating whether said electrically operable unit is in a first, a second or a third zone, said first zone being in a range extending from open to approximately half open, said second zone being in a range extending from approximately half open to almost fully closed and said third zone being in a range extending from almost fully closed to fully closed, said second zone providing a safety zone, and further being operable to determine the time interval between any two consecutive signals coupled to it and to turn off said electric motor means if the time interval between any two consecutive signals exceeds a pre-established standard value and said electrically operable unit is in the first or third zone.

4. The apparatus of claim 3, wherein said computer means further is operable to reverse the direction of travel of said electrically operable units when the time interval between any two consecutive signals during the closing cycle exceeds a preestablished standard value and the unit is in the second zone.

* * * * *